April 15, 1958　　　O. V. MURPHY　　　2,830,716
MEANS FOR CONTROLLING THE ACTUATION OF A MOULD DUMP
Filed Oct. 17, 1955　　　　　　　　　　　　5 Sheets-Sheet 1
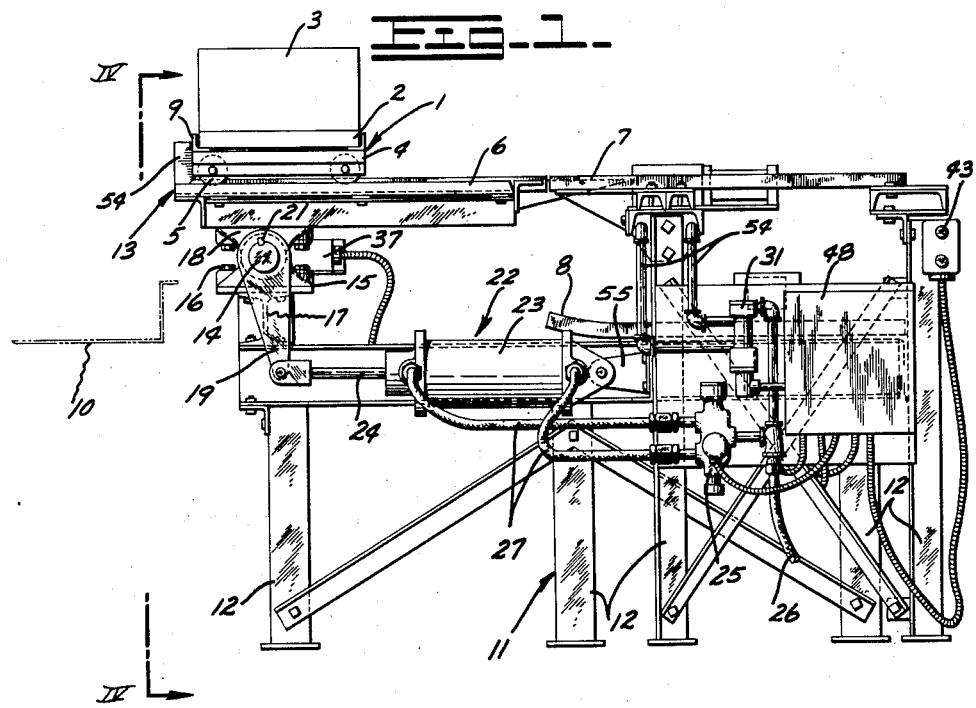
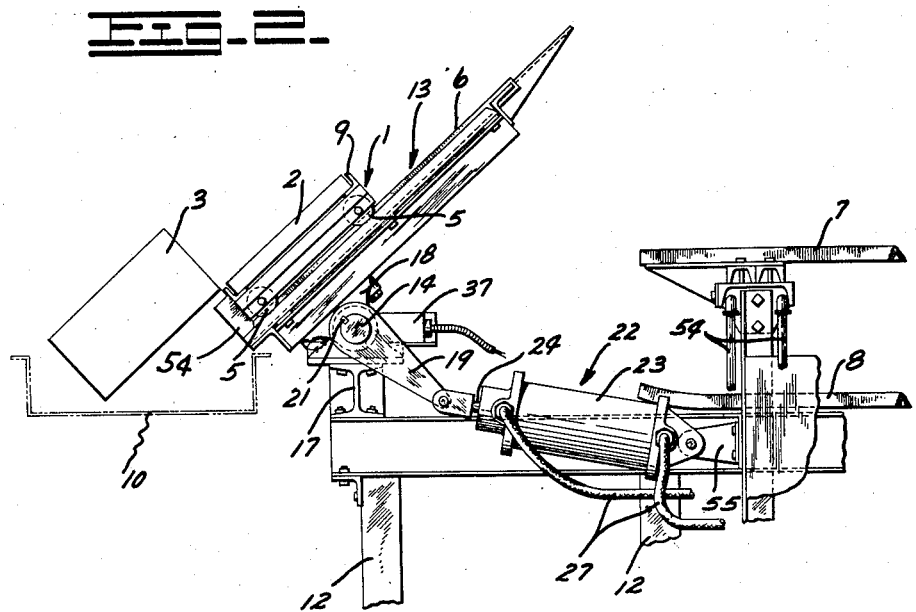

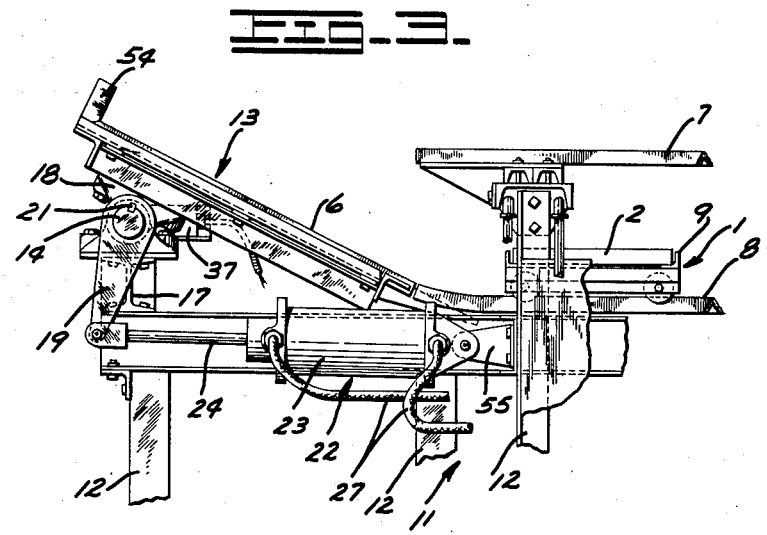
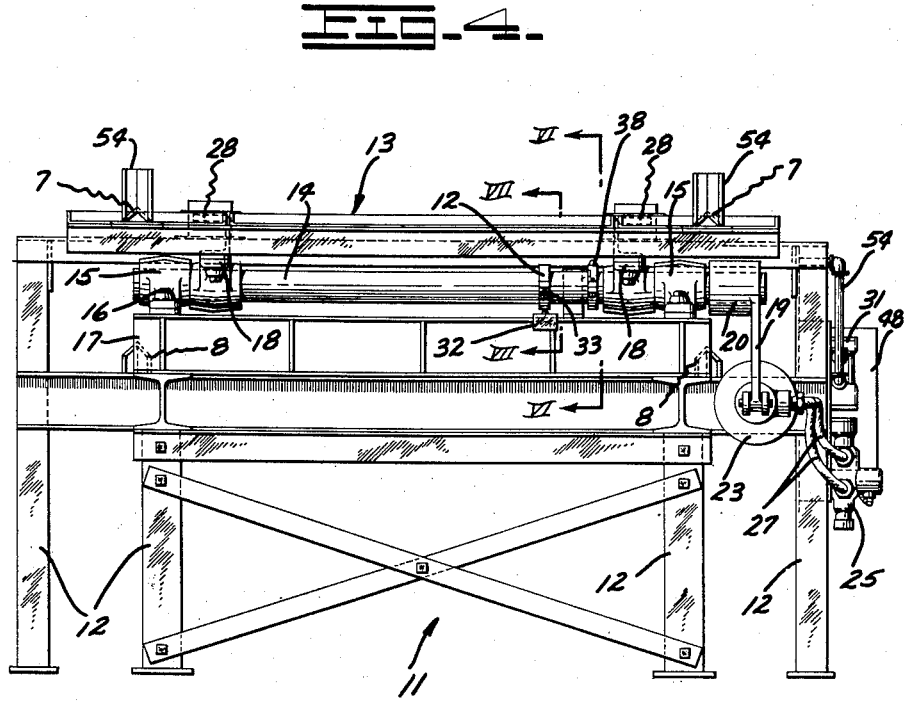

April 15, 1958     O. V. MURPHY     2,830,716
MEANS FOR CONTROLLING THE ACTUATION OF A MOULD DUMP
Filed Oct. 17, 1955     5 Sheets-Sheet 3
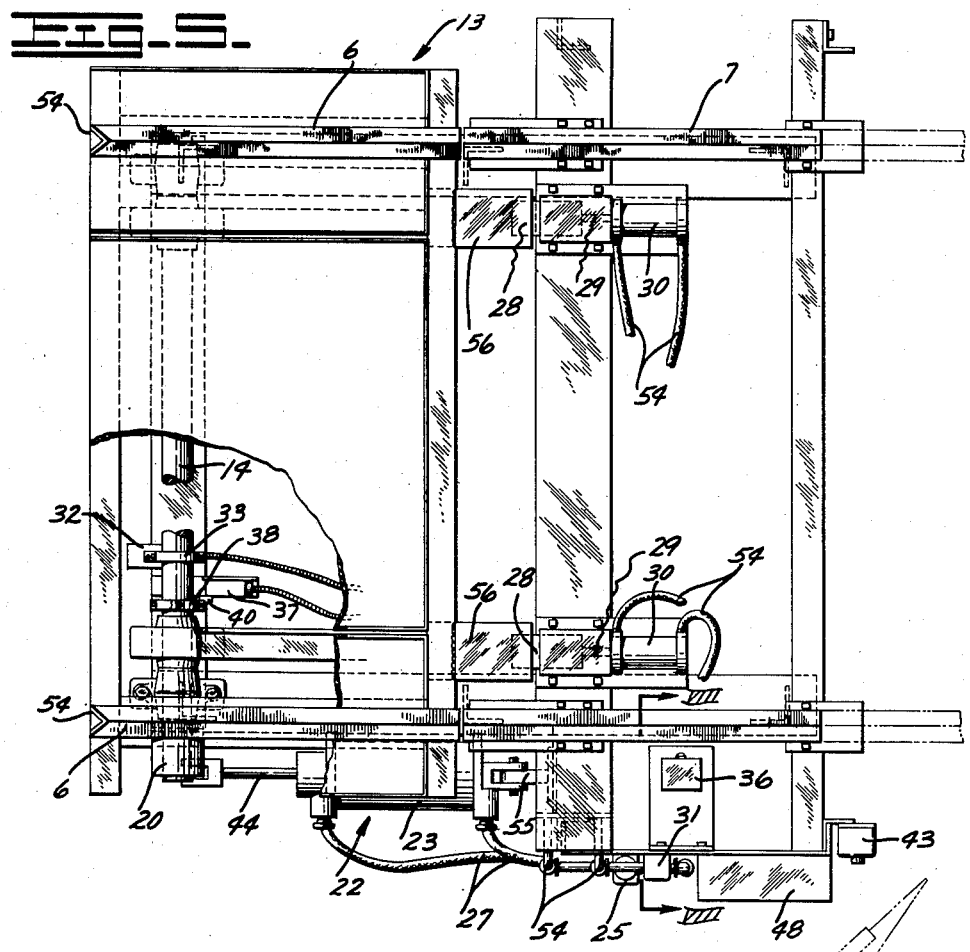
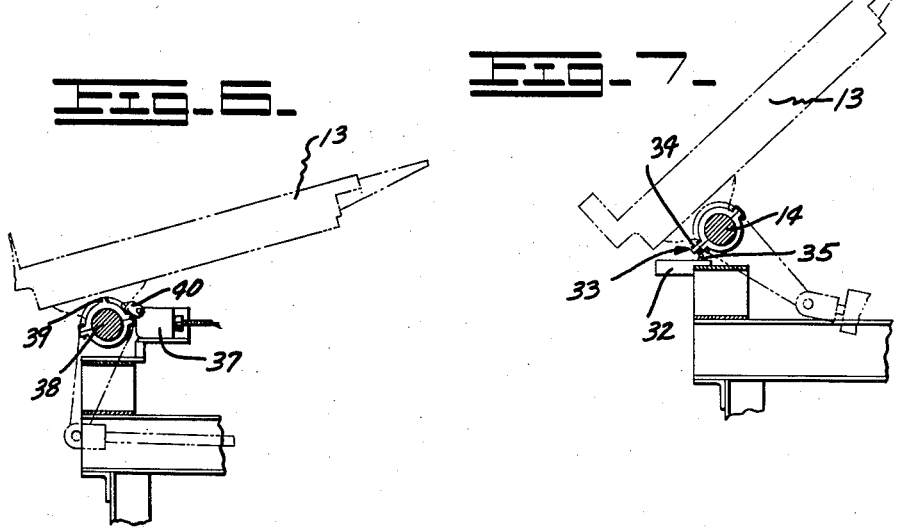

April 15, 1958     O. V. MURPHY     2,830,716
MEANS FOR CONTROLLING THE ACTUATION OF A MOULD DUMP
Filed Oct. 17, 1955     5 Sheets-Sheet 4
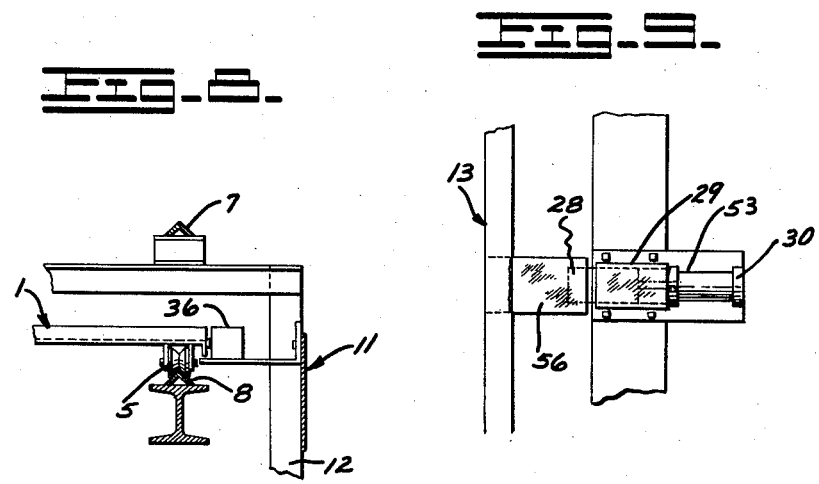
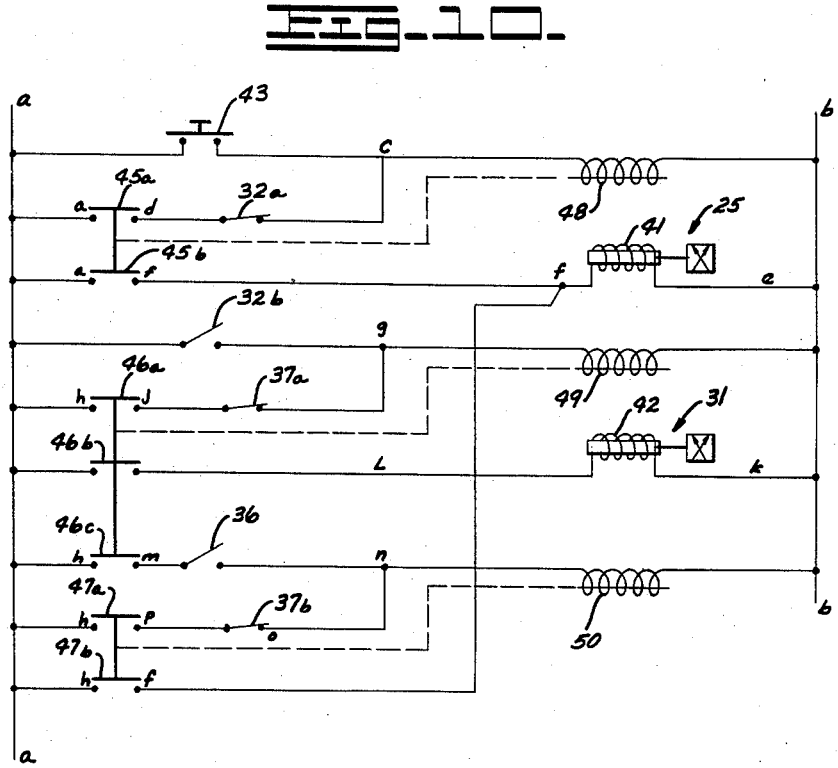

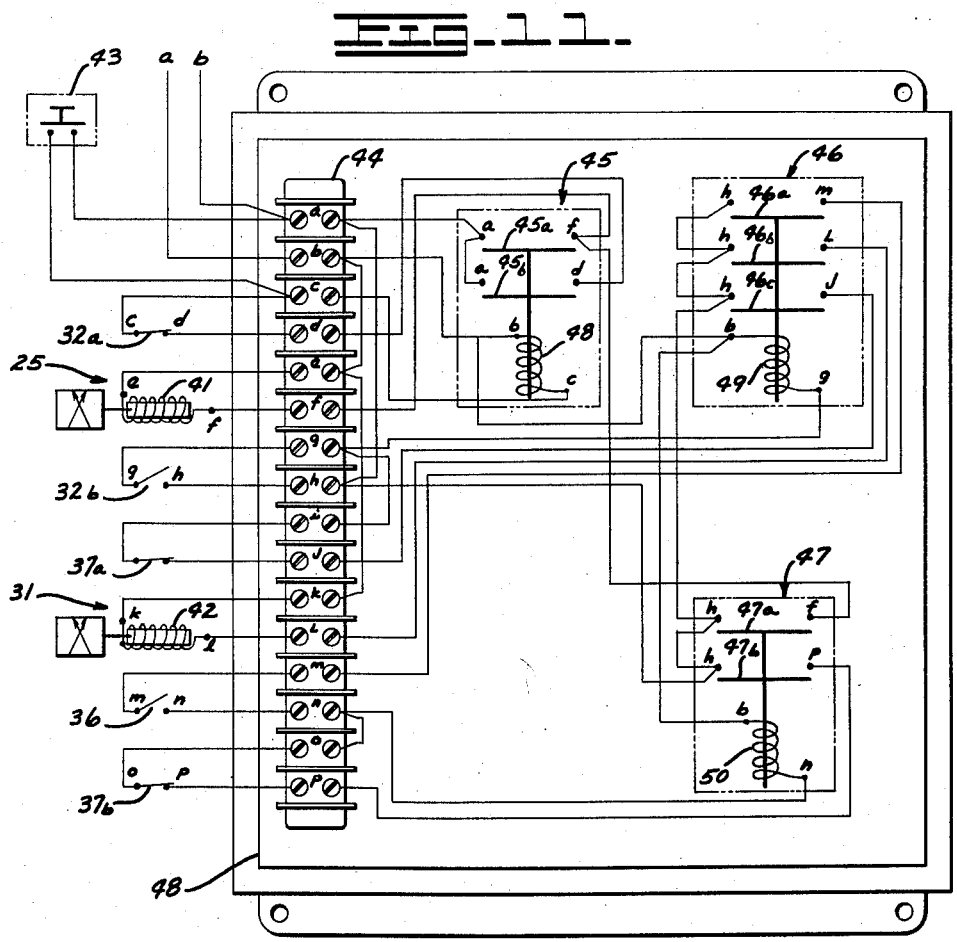
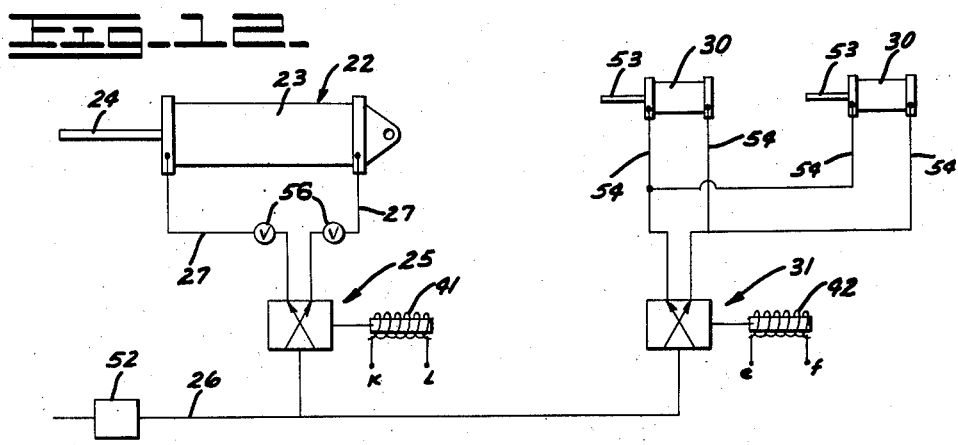

United States Patent Office 2,830,716
Patented Apr. 15, 1958

2,830,716

MEANS FOR CONTROLLING THE ACTUATION OF A MOULD DUMP

Oscar V. Murphy, Newaygo, Mich., assignor to Newaygo Engineering Company, Newaygo, Mich., a corporation of Michigan Application October 17, 1955, Serial No. 540,707

8 Claims. (Cl. 214—46.22)

This invention relates to a conveying and dumping mechanism. More specifically, this invention relates to an automatic conveyor dump mechanism for dumping molds.

In many foundries it is the general practice to form a mold at one location, pour the mold at another, and then after cooling the mold, conveying it to a third location where the mold is dumped and the sand and casting separated. The transporting of the mold and the dumping of it at the dumping station has created quite a problem. The molten metal is usually poured into the mold which is mounted upon a dump cart and the dump cart is moved on conveying rails to the dumping station. It is conventional to use upper and lower conveying rails. The upper rail is used to carry the parts from the pouring station to the dumping station and the lower rail is usually a return track.

The difficulty has been in the steps of receiving the cart, dumping the mold and immediately thereafter returning the cart. Heretofore, most dumping mechanisms have required a pit sunken below floor level to mount the equipment. Several fluid motor cylinders have been utilized to operate the dumping platform. This complicated and bulky equipment is very expensive and in many cases unsatisfactory because of the close timing necessary in receiving the cart on the dumping carriage or cradle, operating the dumping cradle and then returning the cart. The timing of such operation and the alignment of the cradle tracks with the receiving and return tracks must be perfect to prevent malfunctioning of the mold carrying cars as they enter and leave the dumping carriage. Further, because of the inherent operating conditions of foundries, it is desirable to make the equipment as simple as possible since it is subjected to grit and corrosive fumes.

An object of this invention is to provide a powered mold dump which will positively raise and dump the casting molds.

Still another object of this invention is to provide a powered mold dumping unit which is perfectly timed by an automatic control means.

Another object of this invention is to provide a conveying and dumping mechanism having means for aligning the receiving and return tracks with the dumping cradle track.

A further object of this invention is to provide a powered mold dump which is simple and rugged and thus dependable to use for many purposes.

Other objects and advantages of this invention will become apparent upon reading the following specification in conjunction with the accompanied drawings wherein:

Fig. 1 is a side elevational view of the dumping device of this invention with the cradle in carriage receiving position.

Fig. 2 is a fragmentary side elevational view of the dumping device with the cradle in mold discharge position.

Fig. 3 is a fragmentary elevational view of the cradle in carriage return position.

Fig. 4 is a front elevational view of the dumping device in the carriage receiving position of Fig. 1.

Fig. 5 is a plan view of the dumping device with a section of the cradle broken away to show control switches.

Fig. 6 is a fragmentary cross sectional view through VI—VI of Fig. 4, intended to show one control switch being actuated by the cradle, the cradle being shown in phantom.

Fig. 7 is a fragmentary cross sectional view through VII—VII of Fig. 4, intended to show another control being actuated by the cradle, the cradle being shown in phantom.

Fig. 8 is a cross sectional view through VIII—VIII of Fig. 5, intended to show still another control switch being actuated by the carriage as it rolls on the return track.

Fig. 9 is a fragmentary plan view of one of the stops for the cradle of the dumping mechanism.

Fig. 10 is an electrical diagram of the system for controlling the operation of the dumping device.

Fig. 11 is a wiring diagram of the electrical circuits of Fig. 10.

Fig. 12 is a schematic piping diagram for the fluid control means of the dumping device.

Briefly, this invention is concerned with a conveying and dumping device for conveying a mold cart or carriage to a powered dump, dumping it, and returning it. The device includes a frame having an upper receiving track and a lower return track. A cradle or carriage is pivotally mounted on the frame and has a cradle track adapted to be aligned with either the upper or lower tracks.

Immediately underneath the upper tracks there are provided rectractable stops which, when projected outwardly, support the carriage. These stops positively align the cradle tracks with the upper tracks. These stops are adapted to be retracted to allow the carriage to be pivoted downwardly to align with the lower or return tracks. This dumping device also has means for automatically controlling the operation of the fluid motor and also the retractability of the stops. A system is provided whereby after receiving a car on the cradle tracks the fluid motor is started, causing the cradle to tilt upwardly to dumping position where the molds are discharged. There is provided means for reversing the direction of the fluid motor and also retracting the stops when the cradle is tilted to dumping position. Upon reversal of the motor the carriage is pivoted downwardly to a position where the cradle tracks are aligned with the lower return tracks. The carriage then rolls off the cradle onto the lower tracks, actuating a means which causes the motor to again reverse and pivot the carriage upwardly past and above the upper track at which position a third means is actuated which causes the stops to be projected outwardly and the motor to reverse bringing the carriage to rest at its original, load-receiving position.

A more clear understanding of the invention can be obtained by reference to the drawings. In Fig. 1, reference numeral 1 refers generally to a cart or carriage on which is supported the mold board 2 carrying a mold 3. The carriage 1 includes a base 4 supported by four rotatable car wheels 5. As illustrated, the wheels 5 are provided for supporting the carriage for movement on the receiving track 7, cradle track 6, and the return track 8. Carriage 1 also includes angles 9 for retaining the mold boards 2 on the carriage when the cradle 13 is tilted and the mold 3 dumped.

The conveying and dumping mechanism for receiving the carriage 1, dumping the mold 3 onto the conveyor 10, and returning the cart via tracks 8, includes a base or supporting structure 11 having the standards 12. Base 11 supports the entire mechanism including the upper receiving rails 7, the lower return rails or track 8 and the pivoted cradle 13. The cradle 13 is pivoted along one of its ends to the base 11 by means of the axle 14 rotatably journaled in the journals 15 (Fig. 4). The journals 15 are rigidly secured by means of bolts 16 to the I-beam 17 of the base 4. The pillar block 18 secures the cradle 13 to the rotatable axle 14.

It will be seen that the carriage 13, as illustrated in Figs. 1 and 3, is adapted to be pivoted at one end so that at its free end the tracks 6 align with either the upper receiving tracks 7 (Fig. 1) or the lower return tracks 8 (Fig. 3). In the first position (Fig. 1), the carriage 1 will ride along the tracks 7 onto the cradle tracks 6. In the latter position (Fig. 3), the carriage rolls down the cradle track 6 onto the lower return track 8. In still another position of the cradle 13 (Fig. 2) the carriage 1 rolls against stop 54 causing the mold 3 to slide off the carriage into the conveyor 10.

The tilting of the cradle 13 is effected by the crank 19 which is fixedly secured to the rotatable axle 14, by means of a sleeve 20 (Fig. 4) on one end which fits over axle 14 and is secured thereto by the key 21 (Fig. 1). Fluid motor 22 having a cylinder 23 and a piston rod 24 pivotally connected to the end crank arm 19 provides the power for tilting the cradle 13. It will be seen that the cylinder 23 and piston rod 24 are both substantially parallel to the upper and lower tracks 7 and 8. In Fig. 2 the cylinder, which is pivoted at one end to the bracket 55 of base 11, tilts slightly upwardly but it still is substantially parallel to the tracks. This arrangement of the fluid motor 22 and the crank 19 eliminates the need of a sunken pit for accommodating the equipment. Heretofore, many dumping mechanisms which are actuated by a fluid motor have required a pit to be dug into the floor to provide space in which the fluid motors extend. The elimination of such pits is also made possible by pivoting the cradle 13 at the end furthest from tracks 7 and 8, thus allowing the platform to be raised rather than having the front, free end thereof lowered to cause the molds 3 to skid off.

The arrangement of the cradle and the crank also permits the use of a single, fluid motor rather than a plurality of such motors. The use of a single motor simplifies the construction of the entire apparatus and makes it more rugged and dependable. It also substantially reduces the cost of such equipment which usually is extremely expensive.

The fluid motor 22 is controlled by a two position, four way, solenoid, actuated valve unit 25, the exact operation of which will be explained hereinafter. Broadly, the valve 25 controls the flow of a fluid under elevated pressure such as air, from the line 26 to the sides of the piston (not shown) inside the cylinder 23. The air flows from the line 26 through valve 25 to either of the high pressure conduits 27, depending upon the position of the valve in unit 25.

The dump device of this invention also has two retractable stops 28 (Figs. 5 and 9) which when extended are adapted to support the free end of cradle 13. The extensions 56 of cradle 13 rest on the stops 28. Each of these stops 28 is mounted in a housing 29 and is actuated by a reciprocating, fluid motor stop cylinder 30 which in turn is controlled by the two position, four way solenoid actuated valve 31 (Figs. 1 and 5) communicating with the air line 26. Thus valve 31 serves the same purpose as valve 25 by controlling the sides of the piston (not shown) of cylinder 30 on which the pressure from line 26 is exerted. The exact operation of valve 31 in its relation to the rest of the dumping device will be explained more thoroughly hereinafter.

A schematic piping diagram for the fluid motor 22 and cylinders 30 is shown in Fig. 12. It will be seen that an oil and filter unit 52 (Fig. 12) is in the line 26 and flow control valves 53 are provided in the lines 27 to regulate the travel speed of the piston rod 24. The valves 25 and 31 are arranged so that all the piston rods 24 and 53 are out when the solenoids 41 and 42 are de-energized.

The position of control valves 25 and 31 control the operation of the dump mechanism. They are each controlled by an electrical system including three limit switches.

One limit switch 32 (Figs. 4, 5 and 7) is located immediately underneath the cradle 13 in a position where it will be actuated or tripped when the cradle 13 is tilted upwardly to the dumping position of Fig. 2. As shown in Figs. 4 and 7, switch 32 is tripped by the actuating ring 33 fixed on rotatable axle 14. As illustrated, ring 33 has a projection 34 which contacts and actuates the button 35 of switch 32. Any suitable actuating means can be provided instead, for example, a cam-like surface will serve the purpose. Upon tripping of the switch 32 the valves 25 and 31 are each moved to a position causing the motor 22 to reverse, tilting the cradle 13 downwardly to the position of Fig. 3. The actuating cylinders 30 also are actuated to retract the stops 28.

A second limit switch 36 is located immediately adjacent the lower rail 8. Thus, as illustrated in Fig. 8, the carriage 1 riding on return track 8, trips the limit switch 36. Limit switch 36 causes valve 25 to move to a second position reversing motor 22 and pivoting the cradle 13 upwardly.

The third limit switch 37 is located adjacent the side of the rotatable shaft 14 and is tripped or actuated thereby as the carriage is pivoted upwardly past and above the upper track 7. This third limit switch 37, shown best in Fig. 6, is actuated by the actuating ring 38 secured about the axle 14. The ring 38 has a protrusion 39, which in one position of the shaft and cradle 13, trips the limit switch 37. When switch 37 is tripped, valve 31 moves to another position causing the retractable stops 28 to be projected outwardly and the valve 25 is moved to one position causing the motor to reverse, pivoting the cradle 13 downwardly on the stops 28.

The electrical circuit which accomplishes the above objects is shown in Figs. 10 and 11. Limit switch 32 is shown consisting of two switches 32a and 32b. Limit switch 36 consists of one switch. Limit switch 37 consists of switches 37a and 37b. The rest of the circuit includes the solenoid 41 of the solenoid actuated valve unit 25 and the solenoid 42 of the solenoid actuated valve 31. It also comprises the bus bar 44 and relays 45, 46 and 47 all of which are located in control box 48. The relays are electrically connected to the limit switches and starter switch 43 through flexible conduits as shown in the drawings.

In tracing the wiring diagram (Fig. 1) on which the letters a, b, c, etc. are marked to facilitate reading the diagram, it will become apparent to one skilled in the art that the components of the electrical system are connected together as shown in the simplified schematic of Fig. 10. Thus, relay 45 consists of two coupled two-way switches 45a and 45b actuated by the coil 48. The switch 45a is connected in series with limit switch 32a, both of which are shunted by the push button starter 43. Switch 45b is adapted to close the circuit through solenoid 41 of valve unit 25.

Coil 49 of relay 46 is adapted to be energized by means of the limit switch 32b which is shunted by the switch 46a of relay 46 and the limit switch 37a. Thus, momentary closing of limit switch 32b energizes coil 49 closing switches 46a, 46b and 46c. Switch 46b of relay 46 when closed energizes solenoid 42 of valve unit 31. Switch 46c connected in series with limit switch 36 and coil 50 serves the function of preventing the limit switch 36 from being operative unless coil 49 is energized. As a result the tripping of switch 36 before the tripping of limit switch 32b will not energize the coil 50 which closes the switches 47a and 47b of relay 47 causing the solenoid 41 to be energized through switch 47b.

The relationship of all of the electrical components shown in Figs. 10 and 11 can best be explained by describing the operation of the circuit. It should be understood in describing the circuit that the push button switch 43 and all of the limit switches are momentary switches, that is, switches which are closed or opened from their original position only momentarily, the original positions being shown in Figs. 10 and 11.

In starting the operation, the push button 43 is closed, momentarily energizing the coil 48 thus closing switches 45a and 45b and energizing solenoid 41 of valve 25. The coil 48 remains energized due to the closed circuit through 45a and 32a until the limit switch 32 is tripped, opening switch 32a. Upon de-energization of coil 48, switches 45a and 45b are opened, thus causing the coil solenoid 41 to be de-energized. Switch 32b at the same time momentarily closes the circuit through coil 49 energizing it and causing switches 46a, 46b and 46c to close. Switch 46b closes the circuit through solenoid 42 of valve 31, energizing it.

The coil 49 and solenoid 42 remain energized, thus keeping the retractable stops in retracted position. Eventually, limit switch 36 is momentarily closed by the cart 1 closing the circuit through switch 46c and coil 50 which closes the two-way switches 47a and 47b. Switch 47a maintains the closed circuit through the coil 50, and switch 47b energizes solenoid 41. As the carriage pivots upwardly it trips the limit switches 37a and 37b, thus opening the circuits through the coils 49 and 50, de-energizing them and causing the switches 46a, 46b and 46c and 47a and 47b to be opened, de-energizing both the solenoids 41 and 42.

Operation

In the operation of the mold conveyor and dumping mechanism the molds 3 are loaded on the carriages 1 and the casting poured. The filled molds are then moved along the receiving conveyor track. The length of track and the rate of movement are such as to permit cooling. After cooling, the carriages are moved onto the mechanism illustrated and described herein. Usually the carriage 1 rolls down the upper track 7 which is slightly inclined toward the dumping mechanism. Finally, the carriages roll out onto the tracks 6 of cradle 13 which also is slightly inclined toward the pivoted end.

With the cart 1 in position, the push button 43 is pushed to close the circuit through the coil 48, causing the two-way switches 45a and 45b to close. Switch 45b closes the circuit through solenoid 41 of the valve unit 25, energizing it and causing air pressure to be exerted on the left hand face of the cylinder piston, causing the piston rod to be pulled inwardly and the crank 19 to be rotated counterclockwise pivoting the cradle 13 upwardly to the position shown in Fig. 2.

The mold 3 slides off the carriage 1 when the cradle is in this dumping position. Also in that position or slightly beyond it, the limit switch 32 is tripped momentarily, opening switch 32a and closing switch 32b. The opening of switch 32a de-energizes the coil 49, causing the switch 45b to open, de-energizing the solenoid 41, thus causing the valves of the valve unit 25 to move to a second position which permits air pressure to be exerted on the right of the cylinder, pushing the piston rod 24 outwardly and pivoting the crank 19 and cradle 13 in a clockwise direction. The momentary closing of switch 32b closes the circuit through the coil 49 thus causing the switches 46a, 46b and 46c to close. Switch 46b closes the circuit through the solenoid 42 thus energizing it and changing the position of valve 31. In this position of valve 31 air pressure is exerted on the left side of the actuating piston of cylinder 30 which causes stop member 28b to be retracted. This allows the carriage 13 to be pivoted downwardly below the upper track 7 to the lower track 8 as shown in Fig. 3.

When the track 6 is aligned with track 8, the carriage on the cradle 13 rolls down the track 6 onto the track 8 and trips or actuates the limit switch 36 closing the circuit through the coil 50, energizing it and thus causing the switches 47a and 47b to close. The closing of switch 47b energizes the solenoid 41 of the valve unit 25 thus again causing the motor 22 to reverse and pull the crank toward it, pivoting the crank and the cradle in a counterclockwise direction. While the cradle is being pivoted upwardly, the stops 28 are retained in a retracted position due to the energization of the solenoid 42. As the cradle passes beyond the upper track 7, as shown in Fig. 6, it trips or actuates the limit switch 37, opening switches 37a and 37b, thus opening the circuits through coils 49 and 50 and the solenoids 41 and 42. Upon de-energization of the solenoids 41 and 42, the valves in the valve units 25 and 31 are moved to positions which cause air pressure from line 26 to be exerted on the right sides of both pistons of cylinder 23 and 30. The retractable stops 28 are made to project outwardly and the motor 22 drives its piston rod 24 outwardly, rotating the cradle in a clockwise direction. Thus, the cradle is made to rotate until it rests on the stops 28 in which position it is ready for receiving another load.

The apparatus described above eliminates the need for sunken pits. Sunken pits are very undesirable because the digging and construction of them disrupts the foundry's operations. Often it is necessary to go through several feet of concrete. Relocation of service equipment such as electrical and water lines often becomes necessary. As a whole the entire operation is expensive. The apparatus of this invention can be installed directly on the floor of the foundry.

The double acting piston utilized to dump the mold in accordance with this invention has several advantages. It allows for a greater range of mold sizes which can be handled. In the use of gravity return the variation in the sizes of the molds correspondingly varies the speed of the handling of the molds. Large size molds frequently are dumped and returned too fast; while the handling of small size molds is comparatively slow. With this dumping mechanism the speed of operation is essentially the same regardless of the size of molds being dumped. With exceedingly heavy molds it may be desirable to use two double acting fluid motors, one on each side of the cradle. The fluid motors used may in any case be actuated by air, as described, or any suitable hydraulic fluid.

It should be evident from the above description that this invention provides a very simple but rugged dumping device which is completely automatic once it has been put into operation.

It is now clear that the objects set forth above have been achieved by this invention. It should be realized, however, that modifications can be made without departing from the scope of this invention. This invention should be limited only as set forth in the appended claims.

I claim:

1. A mold conveyer for conveying and dumping castings, said conveyer having a frame, an upper track section, a lower track section, and a tiltable cradle pivotally mounted on said frame, said cradle having a track section which when the cradle is in one position is aligned with the upper track section and when the cradle is tilted downwardly is aligned with the lower track section, stop means for supporting said cradle is said one position, a prime mover for tilting said cradle in either an upward or downward direction, and a carriage adapted to ride on said tracks for conveying a mold, the improvement comprising: a system for controlling such prime mover, said system comprising means for starting said prime mover in one direction to cause said cradle to be tilted upwardly from said one position; means for causing the direction of said prime mover to be reversed and said stop means to be retracted when said cradle is tilted upwardly and reaches a dumping position; means actuated by said carriage when riding from said cradle track section onto said lower section for reversing the direction of said prime mover; and means for causing said prime mover to again reverse and said stop means to be projected into operative position when said cradle is tilted upwardly past and above the level of said upper tracks.

2. A mold conveyer for conveying and dumping castings, said conveyer having a frame, an upper track section, a lower track section, and a tiltable cradle pivotally mounted on said frame, said cradle having a track section which when the cradle is in one position is aligned with the upper track section and when the cradle is tilted downwardly is aligned with the lower track section, retractable stop means for supporting said cradle in said one position, a prime mover for tilting said cradle in either an upward or downward direction, and a carriage adapted to ride on said tracks for conveying a mold, the improvement comprising: an electrical system for controlling such prime mover and said retractable stop means, said system comprising a starting switch for causing said prime mover to tilt the cradle upwardly from said one position in alignment with the upper track; a first limit switch actuated by said cradle when said cradle is tilted upwardly to a dumping position, said limit switch causing said prime motor to reverse and tilt the cradle downwardly, said first limit switch also being operatively connected to said stop means causing said stop means to be retracted; and a second limit switch located in proximity to said lower tracks and adapted to be actuated by said carriage rolling from said cradle tracks onto said lower tracks, said second limit switch causing said prime mover to reverse and tilt the cradle upwardly; and a third limit switch actuated by said cradle, as said cradle tilts upwardly past and above said upper track, said third limit switch operatively connected to said prime mover and adapted to reverse it to pivot said cradle in a downward direction, said third limit switch also controlling said stop means causing said stop means to project outwardly into operative position.

3. The mold conveyer and system defined in claim 2 wherein the third limit switch is operative only after the first limit switch has been tripped.

4. A mold conveyer for conveying and dumping castings, said conveyer having a frame, an upper track section, a lower track section, and a tiltable cradle pivotally mounted on said frame, said cradle having a track section which when the cradle is in one position is aligned with the upper track section and when the cradle is tilted downwardly is aligned with the lower track section, a motor for tilting said cradle in either an upward or downward direction, and a carriage adapted to ride on said tracks for conveying a mold, the improvement comprising: a system for controlling said fluid motor comprising a solenoid actuated valve having a first position causing said motor to tilt said cradle upwardly and a second position causing said motor to tilt said cradle downwardly; an electrical system for controlling the position of said valve; said electrical system comprising a starting switch causing said valve to move to said first position whereby said motor tilts said cradle upwardly; a first limit switch actuated by said cradle when tilted upwardly to a dumping position, said first limit switch causing said valve to move to said second position whereby said motor pivots said cradle downwardly; a second limit switch located in proximity to said lower track and actuated by said carriage as it rides from said cradle track onto said lower track, said second limit switch causing said valve to move to said first position whereby said motor pivots said cradle upwardly; and a third limit switch actuated by said cradle as it is being pivoted upwardly past and above said upper tracks, said third limit switch causing said valve to move to said second position causing the cradle to pivot downwardly.

5. A mold conveyer for conveying and dumping castings, said conveyer having a frame, an upper track section, a lower track section, and a tiltable cradle pivotally mounted on said frame, said cradle having a track section which when the cradle is in one position is aligned with the upper track section and when the cradle is tilted downwardly is aligned with the lower track section, stop means for supporting said cradle in said one position, a motor for tilting said cradle in either an upward or downward direction, and a carriage adapted to ride on said tracks for conveying a mold, the improvement comprising: a system for controlling said fluid motor comprising a solenoid actuated valve having a de-energized position causing said motor to tilt said cradle downwardly and an energized position causing said motor to tilt said cradle upwardly; an electrical system for controlling the position of said valve; said electrical system comprising a starting switch for energizing the solenoid of said valve causing said valve to move to said energized position whereby said motor tilts said cradle upwardly; a first limit switch actuated by said cradle when tilted upwardly to a predetermined position, said first limit switch causing said solenoid to be de-energized thereby causing said motor to pivot said cradle downwardly; a second limit switch located in proximity to said lower track actuated by said carriage as it rides from said cradle track onto said lower track, said second limit switch causing said solenoid to be energized and said motor to pivot said cradle upwardly; and a third limit switch actuated by said cradle as it is pivoted upwardly past and above said upper tracks, said third limit switch causing said solenoid to be de-energized thereby causing said motor to pivot said cradle downwardly.

6. A mold conveyer for conveying and dumping castings, said conveyer having a frame, an upper track section, a lower track section, and a tiltable cradle pivotally mounted on said frame, said cradle having a track section which when the cradle is in one position is aligned with the upper track section and when the cradle is tilted downwardly is aligned with the lower track section, retractable stops for supporting said cradle in said one position, a motor for tilting said cradle in either an upward or downward direction, and a carriage adapted to ride on said tracks for conveying a mold, the improvement comprising: a system for controlling said motor and said retractable stops; said motor and said retractable stops being controlled by first and second solenoid actuated valves respectively; said first solenoid actuated valve when energized causing said motor to tilt said cradle upwardly and when de-energized causing said motor to tilt said cradle downwardly; said second solenoid actuated valve when energized causing said stop to be retracted and when de-energized causing said stops to be projected outwardly to support said cradle; an electrical system for controlling said first and second solenoid actuated valves; said electrical system comprising a starting switch for energizing said first solenoid actuated valve causing said motor to tilt the cradle upwardly; a first limit switch actuated by said cradle when tilted upwardly to a dumping position, said first limit switch being adapted when actuated to de-energize said first solenoid actuated valve and to energize said second solenoid actuated valve thereby causing said motor to pivot said cradle downwardly and causing said stops to be retracted; a second limit switch located in proximity to said lower track and actuated by said carriage as it rides from said cradle track onto said lower track, said second limit switch when actuated being adapted to energize said first solenoid actuated valve thereby causing said cradle to be tilted upwardly by said motor; and a third limit switch actuated by said cradle as it is being pivoted upwardly past and above said upper track, said third limit switch when actuated being adapted to de-energize the first and second solenoid actuated valves thereby causing the motor to pivot said cradle downwardly and said stops to be projected outwardly; said third limit switch being operative only after said first limit switch is actuated.

7. A mold conveyer for conveying and dumping castings, said conveyer having a frame, an upper track section, a lower track section, and a tiltable cradle pivotally mounted on said frame, said cradle having a track section which when the cradle is in one position is aligned with the upper track section and when the cradle is tilted downwardly is aligned with the lower track section, retractable stops for supporting said cradle in said one position, a motor for tilting said cradle in either an upward or downward direction, and a carriage adapted to ride on said tracks for conveying a mold, the improvement comprising: a system for controlling the operation of said motor and said retractable stops, said system comprising first and second solenoid actuated valves for said motor and said stops respectively, said first solenoid actuated valve when energized causing said motor to tilt said cradle upwardly and when de-energized to tilt said cradle in a downward direction, said second solenoid actuated valve when energized causing said stops to be retracted and when de-energized to be projected outwardly; first, second and third relays; said first relay adapted to energize said first solenoid actuated valve causing said motor to tilt said cradle upwardly; a starting switch for energizing said first relay; said second relay adapted to energize said second solenoid actuated valve causing said retractable stops to be retracted; said third relay adapted to energize said first solenoid actuated valve causing said cradle to be tilted upwardly by said motor; a first limit switch adapted to be tripped by said cradle at a dumping position of said cradle, said first limit switch adapted to de-energize said first relay and energize said second relay; a second limit switch adapted to be tripped by said carriage as it rolls from said cradle track onto said lower track, said second limit switch being adapted to energize said third relay and thus said first solenoid actuated valve; a third limit switch adapted to be tripped by said cradle as it pivots upwardly past said upper track, said third limit switch being adapted to de-energize said second and third relays and thus said first and second solenoid actuated valves; said third limit switch being operable only when said second relay is energized.

8. A mold conveyer for conveying and dumping castings, said conveyer having a frame, an upper track section, a lower track section, and a tiltable cradle pivotally mounted on said frame, said cradle having a track section which when the cradle is in one position is aligned with the upper track section and when the cradle is tilted downwardly is aligned with the lower track section, retractable stops for supporting said cradle in said one position, a motor for tilting said cradle in either an upward or downward direction, and a carriage adapted to ride on said tracks for conveying a mold, the improvement comprising: an electrical system for controlling said motor and said retractable stops, comprising, a first and second solenoid for actuating the fluid valves of said motor and said stops respectively; first, second, and third relays each having coils; said solenoids and the coils of said relays being connected in parallel to an electrical source; said first relay having two coupled two-way switches, a first connected in series with the coil of said first relay and a second in series with said first solenoid; said second relay having three coupled two-way switches, a first connected in series with the said coil of said second relay, a second in series with said second solenoid, and a third in series with the coil of said third relay; said third reley having two coupled two-way switches, a first connected in series with the coil of said third relay and shunting said third switch of said second relay, and a second in series, with said first solenoid and shunting said second switch of said first relay; a first limit switch having two momentary switches, a first in series with the coil of said first relay and said first two-way switch of said first relay, and a second in series with said coil of said second relay and shunting said first switch of said second relay, said first switch normally being closed in untripped position and said second switch being open in untripped position; a second limit switch having one two-way switch normally open and connected in series with the coil of said third relay and the third switch of said second relay, said second limit switch and third switch of said second relay being shunted by the first switch of said third relay; a third limit switch having two normally closed two-way switches, a first connected in series with the first switch of said second relay, both switches being shunted by a second switch of said first limit switch, and a second in series with the first switch of said third relay, both switches being shunted by said second limit switch and the third switch of said second relay; said switches of said first, second, and third relays being open when the coils of said relays are de-energized and closed when said coils are energized; means for tripping said first limit switch when said cradle is tilted upwardly to a predetermined position; means for tripping said second limit swicth when said cradle is tilted downwardly and said carriage rolls off said cradle track onto said lower track; and means for tripping said third limit switch when said cradle is tilted upwardly past and above said retractable stops; and a momentary starting switch connected in series with the coil of said first relay and shunting the first switch of said first relay.

References Cited in the file of this patent

UNITED STATES PATENTS

| | | |
|---|---|---|
| 1,860,679 | Lockhart et al. | May 31, 1932 |
| 1,929,204 | Jeffrey et al. | Oct. 3, 1933 |
| 2,437,999 | Dana | Mar. 16, 1948 |
| 2,617,498 | Camerota | Nov. 11, 1952 |
| 2,662,651 | Anderson | Dec. 15, 1953 |